United States Patent [19]

Bernard

[11] Patent Number: 4,586,450
[45] Date of Patent: May 6, 1986

[54] SAFETY DEVICE FOR FASTENING THE HEAD OF A SAIL TO A MASTHEAD

[75] Inventor: Bernard Bernard, Lyons, France

[73] Assignee: Societe Anonyme: Leisystem, France

[21] Appl. No.: 664,215

[22] Filed: Oct. 24, 1984

[30] Foreign Application Priority Data

Oct. 28, 1983 [FR] France ............................. 83 17508

[51] Int. Cl.⁴ ............................................. B63H 9/04
[52] U.S. Cl. ................................................... 114/108
[58] Field of Search .............. 114/102, 103, 108, 113, 114/114; 24/241 R, 241 SB, 241 SP; 294/86.17, 82.34, 82.36, 82.37

[56] References Cited

U.S. PATENT DOCUMENTS

| 3,343,514 | 9/1967 | Brett | 114/108 |
| 3,930,290 | 1/1976 | Mangels | 114/108 |
| 4,026,229 | 5/1977 | Winberg | 114/102 |
| 4,093,293 | 6/1978 | Huggett | 114/113 |
| 4,288,495 | 5/1981 | Hood | 114/108 |

FOREIGN PATENT DOCUMENTS

| 1596812 | 7/1970 | France | 114/108 |
| 1474910 | 5/1977 | United Kingdom | 114/108 |
| 2047382 | 11/1980 | United Kingdom | 114/108 |

*Primary Examiner*—Trygve M. Blix
*Assistant Examiner*—Jesûs D. Sotelo
*Attorney, Agent, or Firm*—Bacon & Thomas

[57] ABSTRACT

A safety device for fastening the head of a sail to a masthead and including a snap shackle having an opening controlled under load and provided with an opening-release catch associated with an elastic return and a swivel for securing the shackle to the head of the sail, a remote-control for releasing the catch and mounted for sliding along the sail, and a grip fixed on the end of the remote-control for disposition inside a protective pocket formed on the sail.

7 Claims, 13 Drawing Figures

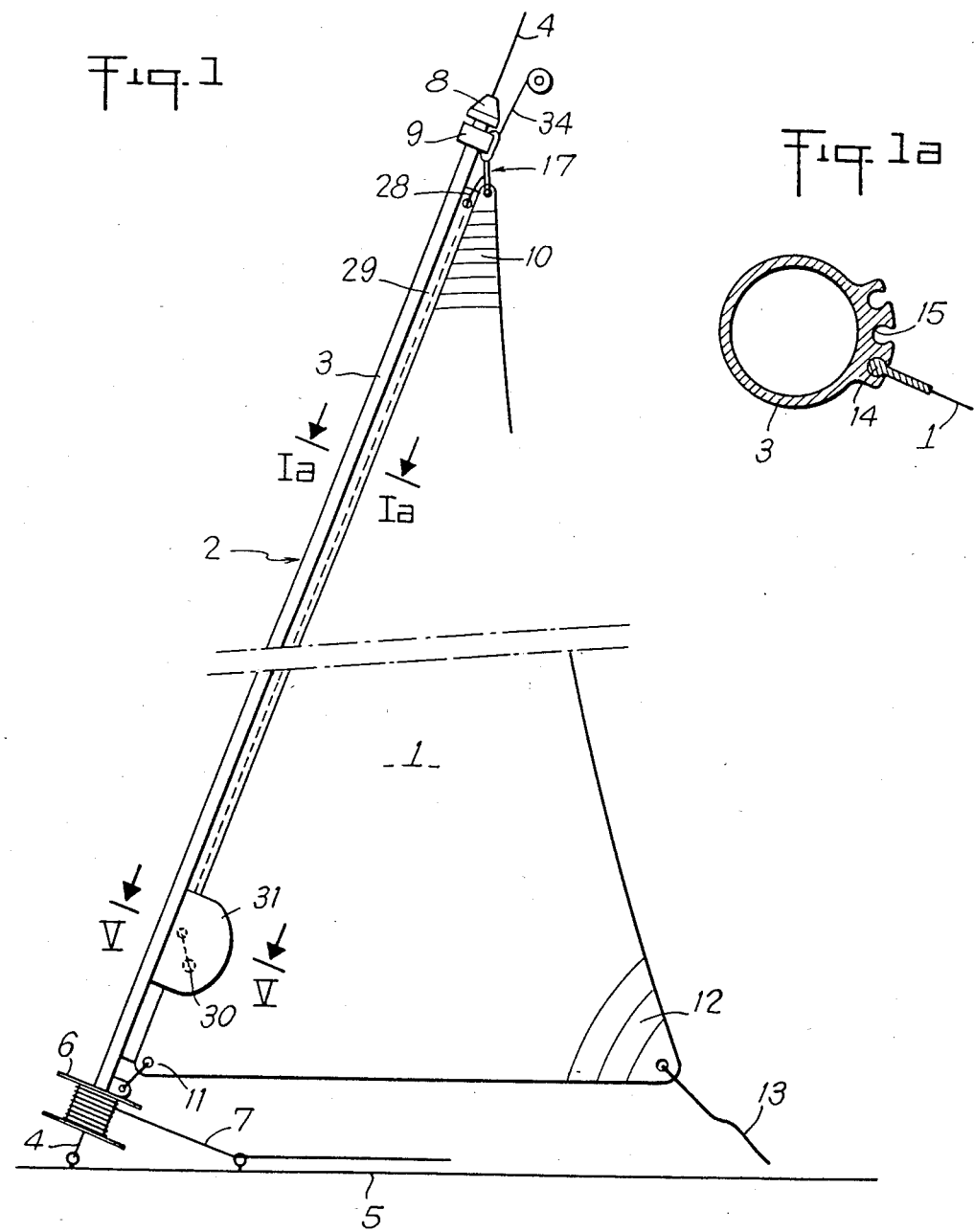

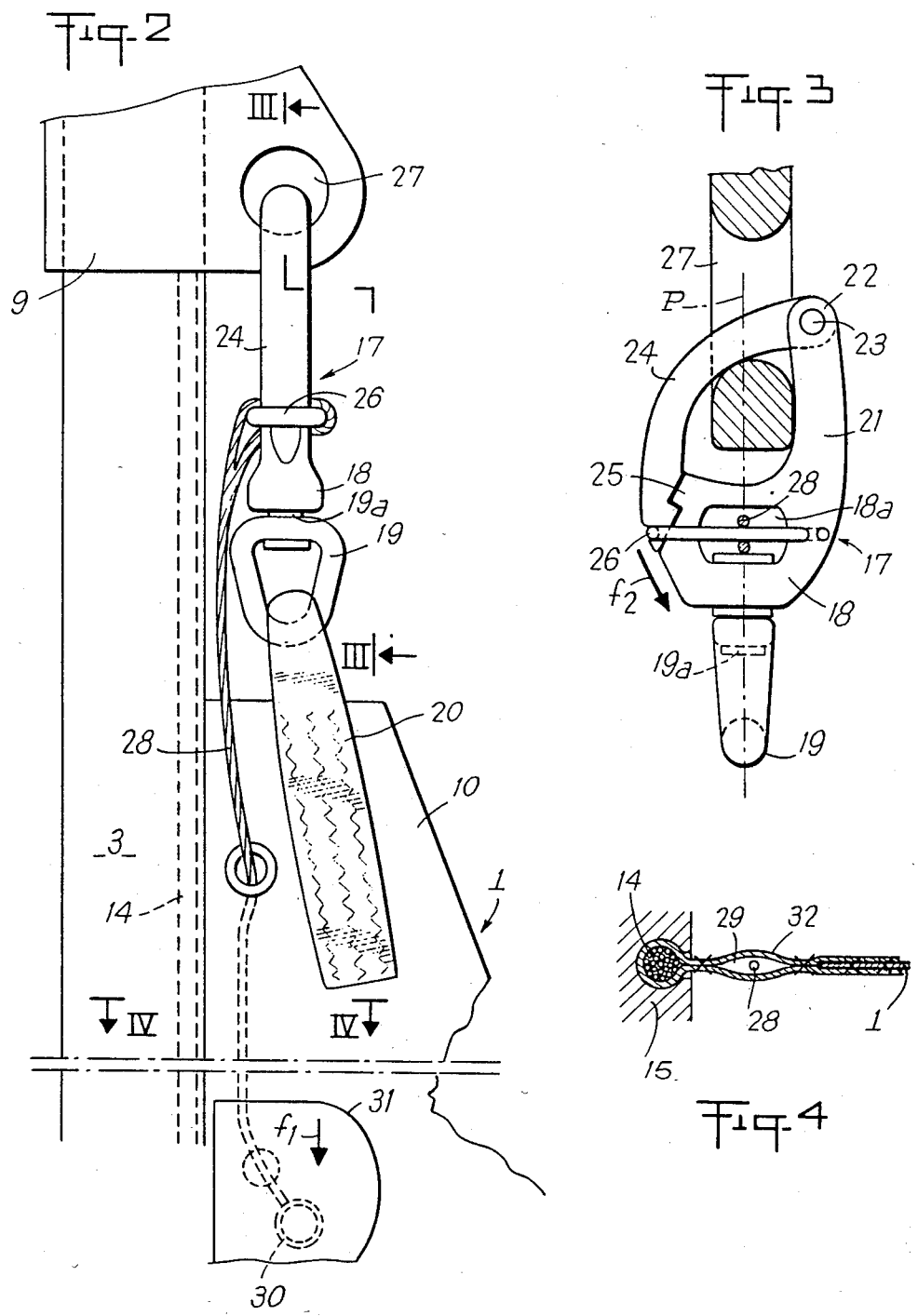

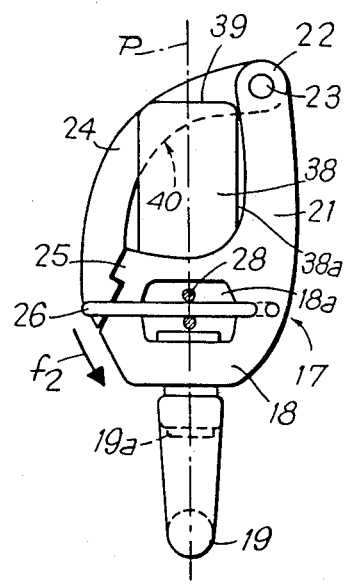
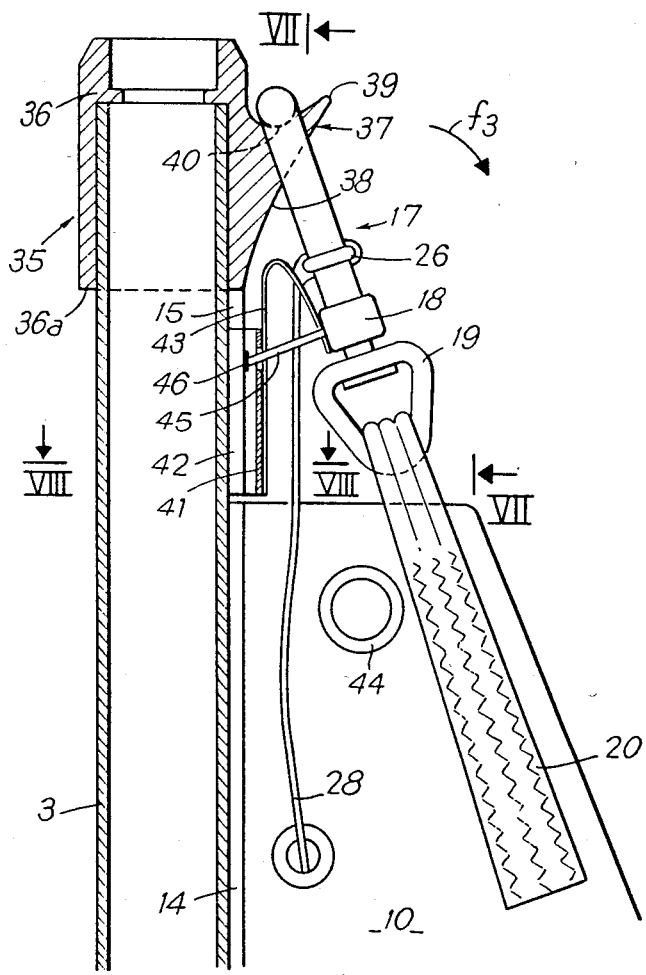
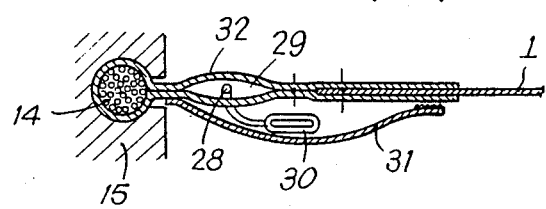

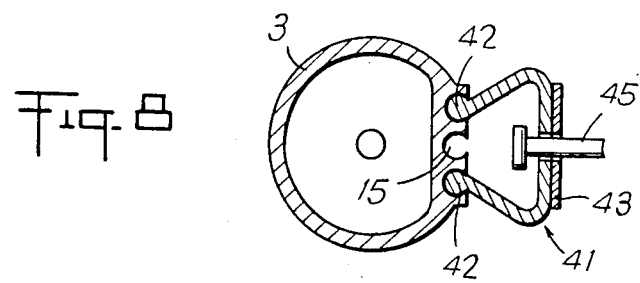
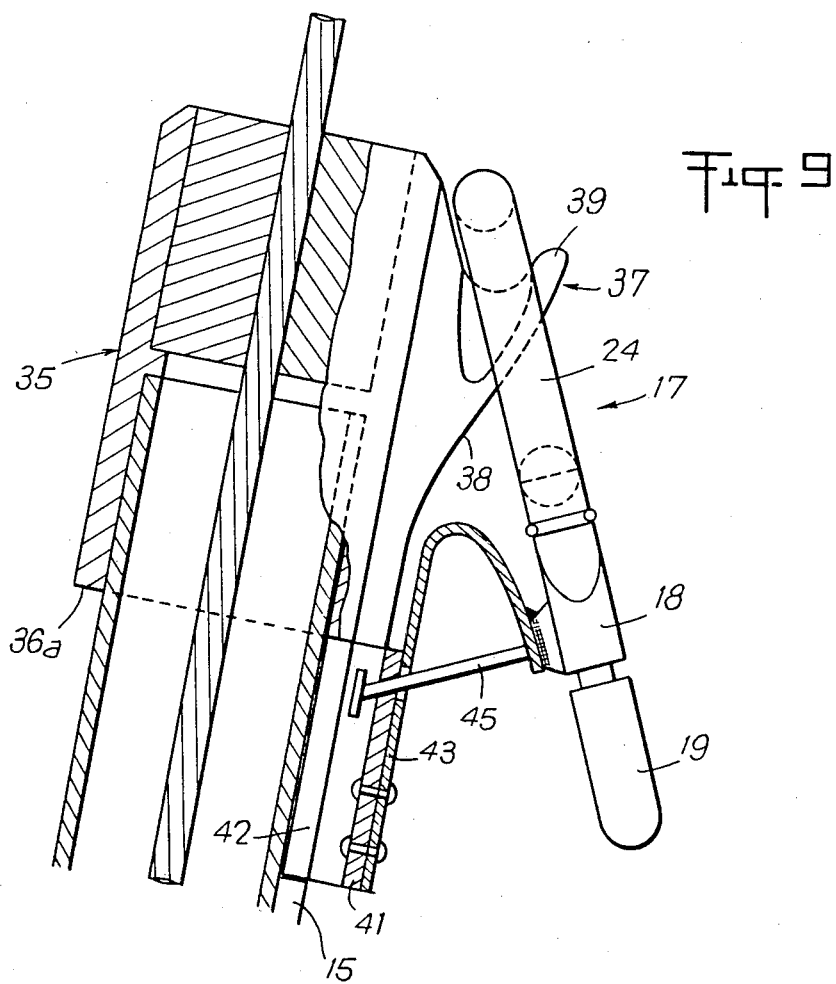

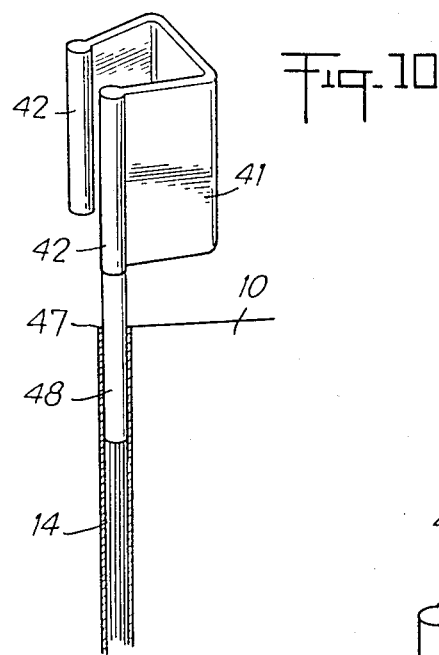
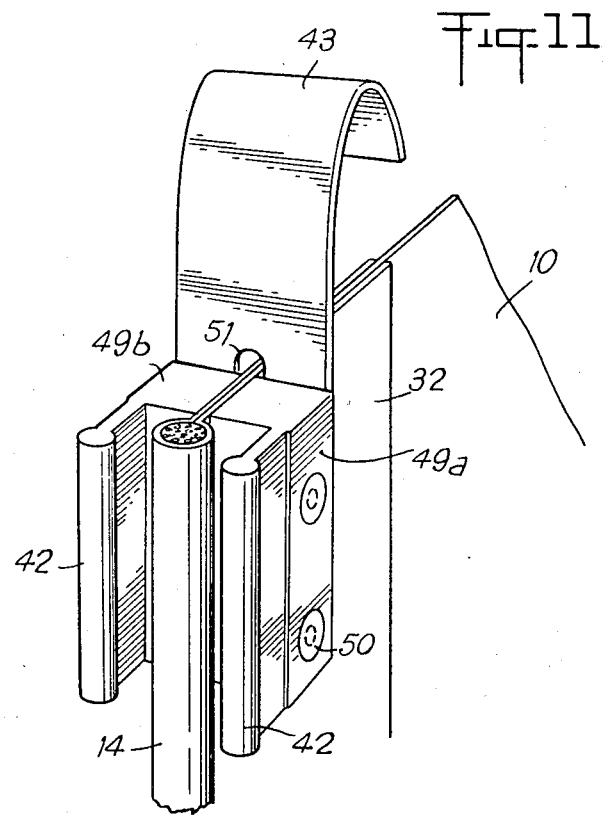
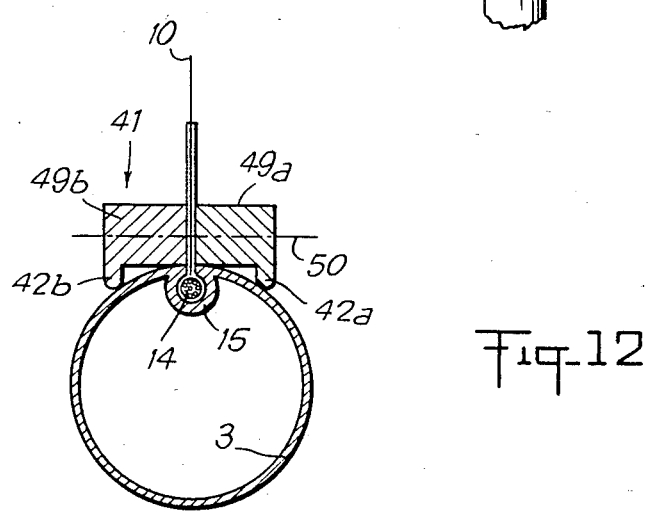

SAFETY DEVICE FOR FASTENING THE HEAD OF A SAIL TO A MASTHEAD

The present invention relates to the technique of setting ships' sails, and more particularly to the technical means used to fasten the head of any type of sail to the head of the carrying mast.

The object of the invention is indifferently concerned with setting either mainsails or jibsails.

Normally, the hoisting of a mainsail involves engaging a luff rope or the like in a luff groove provided in the mast, and the sail is hoisted by a halyard fastened at the head of the sail and passing over a return pulley situated at the masthead.

When a mainsail has been set, the halyard under tension exerts on the axis of the pulley, a compression force which is virtually twice that of hoisting.

Such technical means are not entirely satisfactory, as the halyards are subjected to a permanent tension force which can cause early wearing in the part which comes permanently in contact with the pulley of the masthead.

If on the contrary a mainsail has to be reduced or has to be brought down very quickly, the halyard should be able to pass, slide or run freely over the pulley, without said pulley being an obstacle or without the halyard winding itself or becoming blocked at the masthead.

In either eventuality, the sail can only be brought down by sending a crew member up the mast.

The same type of problem is also met when handling jibsails set by means of a headstay tabling with grooves, and secured by a guide-block travelling along the tabling which may be either pivoting or nonpivoting. The object of said block is to cooperate with a hook situated at the head of the tabling to hold said block in the high position corresponding to the setting of the jibsail.

Said means can also be used with a tabling designed for winding down the sail in order to reduce the surface exposed to the wind.

It is conceivable, when using such means, that the possibility to lower a jibsail, for example to reverse it, essentially depends, first on the possibility to remotely control the opening of the hook of the headboard of the tabling and second, on the free downslidability of the block carrying the sail head. In practice, it is often found that free sliding of the block is impaired by the jamming of the halyard, or else by local deformation of the tabling or of one of its constituting elements subjected to too much pressure in subsequent operations.

If the need arises to bring down the jibsail in bad weather, the aforesaid obstacles can then have serious, if not catastrophical consequences.

It is the object of the present invention to overcome the aforesaid drawback by proposing a new safety device for securing the head of any type of sail to the top of a mast supporting it.

It is also the object of the invention to propose a device permitting quick release of the sail head, if the need arises, by a simple manual operation, which will require no physical strain or acrobatical manoeuver.

Another object of the invention is to propose a safety device which also has the advantage, in one of its embodiments, to simplify the technical means used to at least fasten the sail head to the masthead.

Yet another object of the invention is to propose a safety device which is readily adaptable to the means now used for hoisting either mainsails or jibsails.

A final object of the invention is to propose a safety device which advantageously reduces considerably the weight of the technical means placed at the head of the mast when the sail is set, thus making the ship more stable whilst reducing the strain placed on the mast structure.

These objects are reached according to the invention with a safety device which comprises:

a snap shackle, whose opening is controlled under load and which has an opening-release catch with elastic return means and a swivel to secure it to the head of the sail, remote-control means of releasing the catch, which means are mounted for sliding along the sail, gripping means fixed on the end of said control means and placed, when not in use, inside a protective pocket formed on the sail.

The invention will be more readily understood on reading the following description with reference to the accompanying drawings in which:

FIG. 1 is a partial elevation, diagrammatically illustrating one example of jibsail of a sailing-boat equipped with the device according to the invention;

FIG. 1a is a cross-section, taken on a larger scale, along line Ia of FIG. 1;

FIG. 2 is a side elevation, on a larger scale, corresponding to FIG. 1; and showing in greater details, the technical means according to the invention;

FIG. 3 is a partial section taken along line III—III of FIG. 2;

FIG. 4 is a cross-section taken along line IV—IV of FIG. 2;

FIG. 5 is a cross-section, similar to that shown in FIG. 4, but on a larger scale, along line V—V of FIG. 1;

FIG. 6 is a partial elevation, similar to that shown in FIG. 2, but illustrating one embodiment of the invention;

FIG. 7 is a partial cross-section on a larger scale, along line VII—VII of FIG. 6;

FIG. 8 is a partial cross-section on a larger scale along line VIII—VIII of FIG. 6;

FIG. 9 is an elevational cross-section showing on a larger scale, a detail of the embodiment of FIG. 6;

FIGS. 10 and 11 are two perspective views of partial cross-sections illustrating two possible embodiments of one of the elements constituting the invention;

FIG. 12 is a cross-section illustrating another embodiment of one of the elements constituting the invention.

Referring first to FIG. 1, this shows the jibsail 1 of a sailing boat, mounted on a winding member 2 comprising a tabling or mandrel 3 composed of constitutive segments or elements fitting one into the other. Said elements are held in position and centered by bearings of known design, on a headstay 4 stretching between the deck 5 of a boat and the head of a mast not shown.

The base of the winding member 2 is composed of a drum 6 associated to a handling cable 7, preferably an endless type cable. Said winding member 2 comprises a head board 8 which constitutes a securing abutment for a sliding-block 9 slidable over the tabling 3. Sliding-block 9 is joined to the head 10 of jibsail 1 whose tack 11 is fastened to the drum 6, whereas the clew 12 can be connected to a drum or winch by a sheet 13.

Such jibs are generally mounted on the tabling 3 by luff rope 14, with which they are equipped and which is engaged into a luff groove 15 provided in the tabling 3.

Often, these tablings comprise more than one luff groove 15, generally up to two or three.

The example of application given hereinabove is not in any way restrictive, and the invention, such as hereindescribed, can be applied to any type of sails, even mainsails set by any other means on a mast or like support.

The object of the invention is to provide a safety means of fastening the head of a sail such as a jibsail 1, to the head of a mast or like support, such as for example a tabling 3.

According to the example illustrated in FIG. 2, the device according to the invention makes use of a snap shackle 17, of the type with opening controlled under load, and whose body 18 (see FIG. 3) is extended at its bottom part by a swivel 19 which is fastened, by any known means, to the sail head 10. In the illustrated example, the swivel 19 is fastened to the sail head by a gasket 20 which would if necessary be replaced by a shackle threaded through an eye provided in the sail head 10.

The body 18 of the snap shackle 17 is extended on the side opposite the swivel 19, by a fixed arm 21 ending into a fork member 22 which is preferably offset laterally with respect to the longitudinal axis P of the snap shackle, traversing the pin 19a of the swivel 19. Said fork member 22 supports by its pivot pin 23, a movable arm 24 which is preferably incurved towards the body 18. The free end portion of the movable arm 24 is so shaped as to be complementary to a fastening projection 25 formed by the body 18.

Said movable arm 24 is also designed to cooperate with a catch 26 to open the shackle. Said catch 26 is for example constituted by a pin-like spring mounted on the body 18, by the two curved and offset ends of its parallel branches, to occupy, in that type of assembly, a stable position perpendicular to axis P. The plane occupied by the catch 26 in the rest position is selected so that the segment joining together the two branches of the spring encloses and holds the end portion of the movable arm 24, which is thus secured in a position where it cooperates with the fastening projection 25. The plane of catch 26 is also selected to be substantially median with respect to an opening 18a provided in the body 18.

The snap shackle is mounted, once arm 24 is open, by inserting said arm in an opening 27 provided to this effect in slide-block 9, and by pushing down arm 24 in order to re-constitute the snap shackle, using catch 26 to this effect.

The snap shackle described hereinabove is associated to means 28 of remotely controlling the release of catch 26. Said means 28 are constituted by a cable or cord with preferably little or no extensibility under pulling forces. Said cable or cord 28 is fastened to catch 26, for example by going through opening 18a, and then extending in parallel to the sail 1 which carries it. Preferably, the cable or cord 28 is mounted for free sliding inside a tabling 29 which is provided on one face of sail 1, very slightly offset with respect to the luff rope 14. Said cable or cord 28 is thus stretched over most of the hoist, ending at its lower part with a gripping member 30 which is freely accessible on the outside of tabling 29. FIGS. 1, 2 and 5 show that said gripping member 30 is preferably constituted by a ring which is normally protected and held inside a pocket formed for example by a flap 31 which can be held flat against the corresponding face of sail 1 by any type of instant fastening means.

FIG. 4 shows one embodiment wherein the tabling 29 is formed directly by the tape 32 of the luff rope 14 with which the hoist of sail is equipped. Said tabling 29 could also be constituted by a braid or band fixed by any suitable means on the tape 32.

A sail such as jibsail 1, equipped with the above-described device, can be hoisted or brought down by conventional means such as the halyard 34, diagrammatically illustrated in FIG. 1. But whenever a quick manoeuver is required to bring down the jibsail, for example, in difficult conditions of navigation or if the halyard or the slide-block 9 becomes suddenly blocked, the crew member in charge of the operation then only has to open the pocket 31 which is situated close to him, in order to reach the gripping member 30. Such an operation can be performed very quickly, whatever the conditions of navigation, the flap 31 being opened by a simple pulling pressure, without the need of any tool.

The crew member then grasps member 30 and pulls on it in the direction of arrow $f_1$ (see FIG. 2), for remotely controlling the release of the opening catch 26 which is pushed or pivoted downwards in the direction of arrow $f_2$ as shown in FIG. 3. The effect of this is to release arm 24 which is urged into a pivoting opening movement, about axis 23, by the pressure previously applied on the luff rope. The opening of arm 24 can be performed without any interference, because of the offset position of the fork member 22 which permits, after opening, the automatic release of arm 24 from opening 27. The result is a spontaneous disconnection or unhooking, which completely releases the sail head 10 from the technical means used to fasten it to the masthead.

Thus without any real effort, a crew member can release the sail head whatever the conditions of navigation and/or blockages occurring at the top of the mast and thus bring down, in a very short time, the whole sail or jib 1, in order either to recover the sail completely, or to cope with particularly difficult navigation conditions.

According to one embodiment of the invention illustrated in FIGS. 6 and 7, the safety device is used to ensure direct fastening of the sail 1 to the top of the mast 3 which, in the illustrated example, is equipped with a headboard 35 adapted to this effect. In this particular embodiment, the headboard 35 is constituted by an endpiece, cap or sleeve 36 covering the top end of the mast. The outer surface of said endpiece 36 forms a projection 37 which extends radially in the same general direction as that of the opening of the luff grooves 15. Said projection 37 forms an inclined ramp 38 which connects the base 36a to a top part 39 joined by a groove 40 to the peripheral wall of endpiece 36. The groove 40 is designed so as to offer a support surface which is complementary for the inner surface of the arm 24 of the snap shackle of configuration such as illustrated and described with reference to FIG. 3.

Also in this embodiment, the device according to the invention comprises a guide-block 41 which is so shaped as to be mounted and guided by at least one cylindrical segment 42 in at least one groove 15 of the mast 3. Preferably, as illustrated in FIG. 10, the guide-block 41 comprises two cylindrical segments 42 which are simultaneously engaged for sliding in grooves 15.

It should be understood that any other configuration would also be suitable for guiding the sliding of guide-block 41. For example, the cylindrical segment 42 could be replaced by a claw, an open ring or a slide-guide cooperating with a rib provided on the mast.

Said guide-block 41 is joined to the body 18 of the snap shackle 17 by an elastically deformable connecting member 43. Said connecting member 43 is constituted by a leaf spring bent so as to have two branches, one being joined in any suitable way to the body 18 and the other being fixed by any suitable way on the guide-block 41.

The leaf-spring 43 is arranged so that its plane is perpendicular to that of sail 1, in order to constitute a supporting member ensuring the stability of position of the snap shackle 17, so that its plane is also perpendicular to that of the sail 1. Moreover, said leaf-spring 43 is designed so that the small branch, which is integral with body 18, can hold the snap shackle 17 in position and more particularly so that it can hold the plane of the latter inclined in the direction of headboard 35.

The device such as constituted, permits the automatic hoisting and fastening of sail 1, without the usual means used to this effect.

Indeed, sail 1 is hoisted by conventional means, such as a halyard, which is raised by sliding the luff rope 14 inside a central luff groove 15. Throughout the hoisting operation, head 10 is kept under tension and snap shackle 17 occupies a stable position, without any contact with the mast 3, and by being held by the connecting member 43 slidably guided via guide-block 41 in at least one groove 15.

When the movable arm 24 comes into contact with ramp 38, snap shackle 17 pivots in the direction of arrow $f_3$ (FIG. 6) putting pressure on leaf-spring 43.

Under the pulling action exerted by the halyard, said pivoting movement continues whilst the movable arm 24 goes up the ramp 38. It should be noted with reference to FIG. 7, that such displacement follows a guided path. Indeed, fork member 22, being shifted laterally, then comes into contact with the edge 38a of ramp 38, thus guiding snap shackle 17 automatically in the transversal plane, until such time when movable arm 24 reaches over the top part 39. At that moment, the elastic member 43 releases the pressure stored and causes snap shackle 17 to pivot in the reverse direction to arrow $f_3$ and the automatic engagement of movable arm 24 into the groove or hollow 40 of projection 37.

In this condition, the sail hoist can be pulled taut to consolidate the fastening of snap shackle 17 on projection 37 which fastening is automatically made firm by the actual weight of sail 1.

If necessary, the halyard can be unhooked and brought back to its initial position by way of a conventional return cable after tautening the luff rope.

If sail 1 had to be brought down quickly and if, as a result, sail head 10 had to be released from the masthead 3, whether or not the sail is still joined to the halyard, the crew member performing this operation would use, as previously indicated, the gripping member 30 to control the opening of catch 26 and release movable arm 24.

Snap shackle 17 being then under load opens spontaneously, this releasing arm 24 from the projection 37.

In this particular embodiment of the invention, it should be noted that tautening between the sail and the masthead is done directly by means of snap shackle 17 and projection 37, this consequently permitting to relieve completely the halyards, generally used to this effect in conventional constructions. This enables to do away with conventional means such as return pulleys, and as a result to reduce the static and dynamic load imposed on a mast such as 3, whether this mast is a jib-winding mast or the principal mast of a mainsail.

When a sail has been entirely brought down, it suffices to close up snapshackle 17 for the device to be once again usable for securing the sail to the masthead According to another embodiment of the invention, the sail head 10 is provided with means 44 of fastening the halyard hook. Such means 44 may be constituted by an eye or else by a loop formed by a tape sewn onto the sail head 10. In this way, the sail is hoisted by exerting a pulling force directly on the sail head, thus permitting to keep the snap shackle inside the plane conferred thereto by the elastically deformable member 43, with a view to making contact easier between arm 24 and ramp 38, and to facilitating the pivoting movement in the direction of arrow $f_3$.

It is also possible with this hoisting method, to eliminate any force which could cause maximum opening of the leaf-spring 43, which leaf-spring can, if necessary, be provided for that same purpose, with an abutment 45 limiting the opening of its constituting arms. Said abutment 45 can be constituted by a pin integral with body 18 and traversing the arm and/or the guide-block 41 beyond which it forms an abutment head 46.

FIG. 9 illustrates how it may be advantageous to design the guide-block 41 and/or the headboard 35, so as to make it possible for said guide-block to abut against the lower edge 36a of the headboard 35. This determines the maximum stroke for hoisting the sail and represents an information remotely transmitted to the crew members carrying out the operation. Indeed, the opposition met by the crew members in the hoisting operation confirms the automatic engagement of arm 24 into groove 40.

FIG. 10 illustrates how it may also be advantageous to provide a connection between the guide-block 41 and the upper edge 47 of the sail head 10, in order to eliminate any tearing tendencies which could be due to a pulling force exerted by the halyard, when the guide-block 41 is in a position of positive abutment against the peripheral edge 36a. According to said figure, the luff rope 14 is interrupted off that edge 47 and the tape 32 then contains a metallic rod 48 which is firmly gripped and/or fastened by any other suitable means. Said rod 48 extends beyond said edge 47, so as to be able to rest against one of the cylindrical segments 42 of the guide-block 41 shaped so that the cylindrical segment in question is engaged into the groove 15 receiving the luff rope 14.

FIG. 11 shows a variant embodiment wherein the guide-block 41 is mounted directly on the said head 10, in such a way as to form part thereof. According to this embodiment, the guide-block 41 may be constituted by two complementary parts 49a and 49b which are connected together by connecting means 50, such as rivets or screws, etc. . . , traversing the two complementary parts and sail 1. In such a case, the guide-block 41 is mounted on the part of the tape which is contiguous to luff rope 14, being thus closer to the mast and cooperating with the headboard 35 then in abutting position. In such a case, either or both complementary parts 49a and 49b can be formed by a cylindrical segment 42 which would then cooperate with a lateral luff groove 15, to ensure the transverse guiding of guide-block 41.

Connecting member 43 may be constituted, as indicated hereinabove, by providing for example in the large arm, an axial slot 51 permitting the fitting of such a member 43 over the sail head 10, to fasten the leaf spring 43 on the two complementary parts 49a and 49b.

FIG. 12 illustrates an embodiment wherein the guide-block 41 such as described hereinabove comprises extensions 42a and 42b designed to cooperate by resting against the peripheral surface of the mast when the latter comprises for example only one luff groove 15 for sliding the luff rope 14 of a sail 1.

Amongst the advantages of the invention, it must be mentioned that the fastening device is inexpensive but reliable, since the snap shackle 17 always works in the normal conditions for which it is mechanically designed.

In addition, the device according to the invention can be readily operated, without any particular knowledge or experience, and is very reliable and safe to use whenever a sail has to be brought down rapidly, in dangerous or difficult conditions of navigation. And, in the embodiment wherein the device also acts as a fastening or suspension means for the sail head, the object of the invention makes the constructions of the mast easier in that it eliminates the need for sliding members, normally used to this effect, and in particular jibsail winders.

What I claim is:

1. A safety device for the quick connection and disconnection of the head of a sail having a luff rope with respect to a masthead carried by a mast, which device comprises:

(a) a snap shackle defined by a body disposed within a plane, a swivel carried at one end of the body for attachment to the head of the sail, a fixed arm defining a laterally offset fork with respect to the axis of the swivel carried at the other end of the body, the body defining a fastening projection, a catch supported by the body in relation to the projection, the catch including a releasing means attached thereto, and a movable arm supported by the fork, the movable arm including a free end configured for complementary engagement with the fastening projection;

(b) the mast including a plurality of longitudinal luff grooves;

(c) the head of the mast including a projection extending radially in the same general direction as that of the luff grooves for engagement by the snap shackle, a portion of the projection defining an inclined ramp;

(d) a slide block slidably supported in at least one luff groove of the mast; and (e) an elastically deformable connecting member interposed between the slide block and the body for securing the body in a position wherein its plane is disposed both perpendicular to the plane of the sail and inclined towards the head of the mast.

2. The device of claim 1 wherein the deformable connecting member includes a bent leaf spring including leg portions defining planes which are disposed perpendicular to the plane of the sail.

3. The device of claim 2 wherein the deformable connecting member includes an abutment for limiting the movement of the leg portions with respect to each other.

4. The device of claim 1 wherein the slide block is of sufficient length to permit same to abut against the lower portion of the masthead.

5. The device of claim 1 wherein the slide block is of sufficient length to permit same to simultaneously abut against both the luff rope of the sail and the lower portion of the masthead when the snap shackle is engaged on the projection.

6. The device of claim 1 wherein the slide block is carried by the sail.

7. The device of claim 1 wherein the projection includes an upper groove defining a complementary surface for engagement by an inner face of the movable arm.

* * * * *